United States Patent [19]

Tumolo

[11] 3,729,385
[45] Apr. 24, 1973

[54] INHIBITION OF ETHER DECOMPOSITION DURING DISTILLATION BY QUINOLINE ADDITION

[75] Inventor: Anthony L. Tumolo, Havertown, Pa.

[73] Assignee: Sun Research and Development Co., Philadelphia, Pa.

[22] Filed: July 29, 1971

[21] Appl. No.: 167,482

Related U.S. Application Data

[63] Continuation-in-part of Ser. No. 807,995, March 17, 1969, abandoned.

[52] U.S. Cl. ................... 203/6, 203/58, 260/614 R, 260/611.5
[51] Int. Cl. ............................................. C07c 41/12
[58] Field of Search ................. 203/6, 8, 9, 58; 260/611.5, 614 R, 614 A

[56] References Cited

UNITED STATES PATENTS 3,003,001 10/1961 Kiersteud et al. ................. 260/611.5
3,119,766 1/1964 Voltz et al. ........................... 208/291
3,227,766 1/1966 Kruse et al. .............................. 203/6

FOREIGN PATENTS OR APPLICATIONS 809,318 2/1959 Great Britain .................... 260/614 R Primary Examiner—Wilbur L. Bascomb, Jr.
Attorney—George L. Church et al.

[57] ABSTRACT

Propylene trimer methyl ether is of interest as a non-air polluting solvent; however, in the production of the ether, there is a major proportion of unreacted propylene trimer from which the ether must be separated. Distilling the propylene trimer methyl ether out of the ether-trimer mixture results in up to 30 percent degradation of the ether. By adding 0.1–10 weight percent quinoline to the distillation mixture, however, reduces degradation loss to less than 5 percent.

2 Claims, No Drawings

INHIBITION OF ETHER DECOMPOSITION DURING DISTILLATION BY QUINOLINE ADDITION

CROSS REFERENCE TO RELATED APPLICATION

This application is a continuation-in-part of Ser. No. 807,995 filed Mar. 17, 1969 and now abandoned.

BACKGROUND OF THE INVENTION

1. Field of the Invention

The present invention relates to a method of reducing the degree of degradation of propylene trimer methyl ether during the distillation thereof.

2. Description of the Prior Art

Propylene trimer methyl ether has come into interest as a solvent of low volatility which satisfies recent stringent air pollution regulations such as Los Angeles' "Rule 66."

The propylene trimer methyl ether can be prepared by reacting the propylene trimer with methanol with an acidic ion exchange resin at a temperature in the range of 50°–150°C. The ion exchange resin functions as an etherification catalyst. This process is disclosed in commonly-assigned U. S. Pat. No. 3,119,766, issued Jan. 28, 1964 to Sterling E. Voltz and Raymond Wynkoop. It has been found, unfortunately, that the distillation of these mixtures of propylene trimer and propylene trimer methyl ether gives erratic decomposition of the ether to the original reactants, i.e., methanol and propylene trimer. As much as 30 percent decomposition has been observed even during vacuum distillations. The present invention significantly reduces the decomposition of propylene trimer methyl ether.

SUMMARY OF THE INVENTION

The present invention is an improvement in the process for the distillation of propylene trimer methyl ether from a mixture containing propylene trimer methyl ether and propylene trimer wherein the improvement comprises adding 0.1 to 10 weight percent, more preferably, from 0.5 to 7 weight percent of quinoline to the mixture.

DESCRIPTION OF THE PREFERRED EMBODIMENTS

It is convenient to employ as the propylene trimer source an olefinic gasoline fraction boiling in the range of 160°–400°F. (53–70% $C_9$), more preferably 260°–300°F. (96% $C_9$). A summary of the $C_9$ skeleton is 0.36 percent straight chain, 14.7 mono-substituted chains, 57.7 percent di-substituted chains and 3.7 percent tri-substituted chains. The remainder is not identified. The propylene trimer can be obtained in the usual manner by polymerization of propylene by means of a phosphoric acid polymerization catalyst.

The molar ratio of methanol to propylene trimer can vary widely but will generally be in the range of 0.3:1 to 20:1, or more preferably 1:1 to 5:1.

As the etherification catalyst, any highly acidic ion exchange resin is satisfactory. These are generally composed of sulfonated resins. Various types of resins have been used in their preparation, e.g., polystyrene, phenolformaldehyde, coumarone-indene and the like. Porous forms of acidic ion exchange resins are usually preferred for the reaction.

Generally, the reaction involves passing a liquid phase mixture of the propylene trimer and the methanol through a bed of the acidic ion exchange resin at a temperature in the range of 60°–125°C. and allowing sufficient contact time to convert a portion of the propylene trimer to ethers. Unfortunately, the reaction is far from quantitative. The effluent from the reaction zone is then processed for the separate recovery of the unreacted propylene trimer, the ether products, and any excess alcohol.

A preferred method of separation is to first extract the etherification product with water to remove methanol, then to distill the remaining ether-propylene trimer mixture to recover an ether product free of the starting materials.

The exact mechanism of the quinoline in the distillation mixture is not known; however, the decomposition has been reduced to less than 5 weight percent.

The following examples are presented to further illustrate the invention:

EXAMPLE 1

A Soxhlet type apparatus consisting of a 12 liter reaction pot connected to a reflux condenser which fed the reflux into a 1.5 liter extractor zone was used for the etherification of a propylene trimer boiling in the range of 260°–300°F. (96% $C_9$) which was obtained by phosphoric acid polymerization of propylene. 800 grams of a highly acidic ion exchange resin of the sulfonated polystyrene type, sold commercially under the trademark, "Amberlite IR–120 (H form)" was placed in the extractor and the pot was charged with 6 liters of the propylene trimer and 2 liters of methanol. 10 grams of KOH pellets were added as a precautionary measure in the event that some of the acidic resin should be washed into the reaction pot. The outlet to the condenser was connected to a cold trap to collect any low boiling material that might be formed. The reaction mixture was refluxed for a total of 72 hours. During the reaction, the mixture in the post consisted of two phases. About 24 weight percent of the total propylene trimer was etherified. After completion of the 72 hour reaction period, the reaction mixture was water washed to remove the methanol.

EXAMPLES 2 – 4

Three portions of the water-washed product from Example 1 were subjected to distillations in a packed column to recover the propylene trimer methyl ether. The conditions and results are set out in the table below:

| Example | 2 | 3 | 4 |
| --- | --- | --- | --- |
| quinoline wt. % | 5 | 0 | 0 |
| pressure | atm | atm | 100 mm Hg |
| decomposition wt. % | 3.5 | 12 | 30 |

The invention claimed is:

1. In the process for the distillation of propylene trimer methyl ether from a mixture containing propylene trimer methyl ether and propylene trimer wherein the improvement comprises adding 0.1 to 10 weight percent of quinoline to the mixture.

2. The process according to claim 1 wherein 0.5 to 7 weight percent of quinoline is added to the mixture.

* * * * *